Oct. 3, 1944.  O. W. PHILLIPS  2,359,439
JAR LIFTER
Filed March 6, 1944
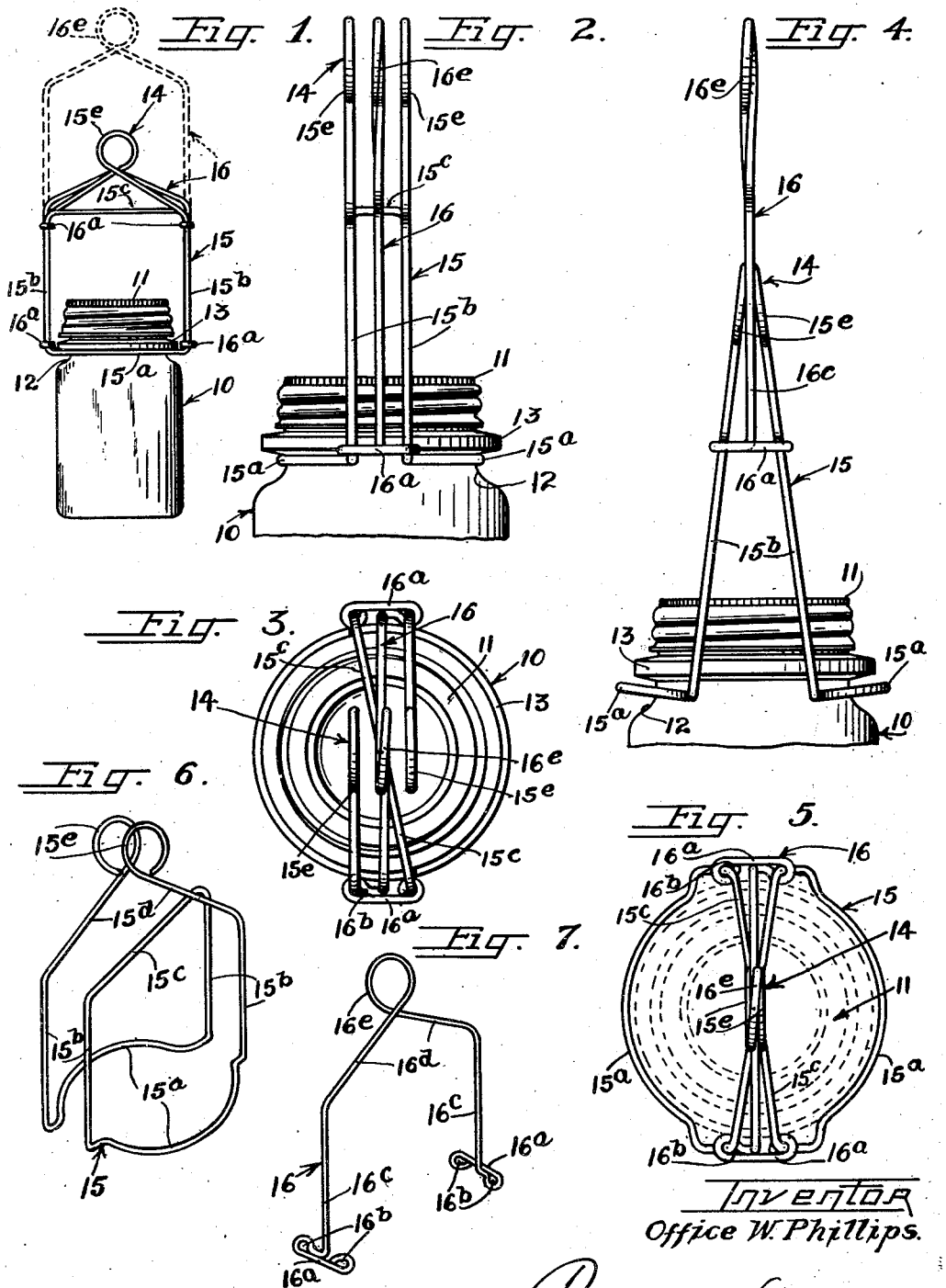
Inventor
Office W. Phillips.

Patented Oct. 3, 1944

2,359,439

UNITED STATES PATENT OFFICE 2,359,439

JAR LIFTER

Office W. Phillips, Maywood, Ill.

Application March 6, 1944, Serial No. 525,203

5 Claims. (Cl. 294—33)

This invention relates to a lifting device or tongs especially adapted for easy attachment to and detachment from a container such as a jar.

Specifically, the invention deals with a jar lifter having opposed jar neck encircling jaws and mechanism for spreading the jaws apart to fit over the bead of the jar and for locking the jaws against spreading to retain them under the jar bead.

The invention will hereinafter be particularly described in connection with a lifter or tongs for a Mason type jar, but it will be understood that the device of this invention is not limited for use with any particular type container or article, since it is generally applicable as a gripping tongs or holder.

In canning and sterilization processes, containers such as Mason jars are usually immersed in boiling water. The selective removal of a jar or container from the boiling water without burning of the fingers is difficult. The present invention, however, now provides a readily operated, inexpensive, fool-proof jar lifter which is quickly slipped over the neck of a jar under the bead thereof and locked around the neck so as to have thrusting engagement with the bead. The jar can then be readily moved through manipulation of the lifter without exposing the operator to contact with the jar. The lifter itself can be sterilized and provides a sanitary holder.

It is, then, an object of the invention to provide a fool-proof, inexpensive, easily manipulated jar lifter.

Another object of the invention is to provide a lifter or tongs made from two pieces of wire.

A still further object of the invention is to provide a lifter having opposed jaws, and shiftable fulcrum members holding the jaws against spreading in one position and effecting spreading of the jaws in other positions.

A still further object of the invention is to provide a wire jar lifter wherein one wire piece forms spaced opposed clamping jaws, spreading handles for said jaws, and levers between the handles and jaws, and wherein a second wire piece provides sliding fulcrums for said levers to hold the jaws against spreading and to cooperate with the handles for spreading the jaws, depending upon the positions of the fulcrums on the levers.

Other and further objects of the invention will be apparent to those skilled in the art from the following detailed description of the annexed sheet of drawings which, by way of preferred example only, illustrates one embodiment of the invention.

On the drawing:

Figure 1 is a front elevational view of a Mason jar having a lifter according to this invention mounted thereon and illustrating, in dotted lines, the position of a portion of the lifter for unlocking the lifter from the jar.

Figure 2 is an enlarged fragmentary side elevational view of the jar and lifter shown in Figure 1.

Figure 3 is a top plan view of the jar and lifter shown in Figures 1 and 2.

Figure 4 is a side elevational fragmentary view similar to Figure 2 but illustrating the lifter in spread position for removal from and for mounting on the jar.

Figure 5 is a plan view of the assembly of Figure 4.

Figure 6 is an isometric view of the clamping jaw piece of the lifter shown in Figures 1 to 5.

Figure 7 is an isometric view of the bail or locking fulcrum piece of the lifter shown in Figures 1 to 5.

As shown on the drawing:

In Figures 1 to 5 inclusive the reference numeral 10 designates generally a conventional Mason-type jar having a screw cap 11 thereon and provided with a reduced diameter neck portion 12 and an outturned flange or bead 13 above the neck portion 12 but beneath the cap 11. The reference numeral 14 designates generally the lifter for the jar 10. The lifter 14 is composed of a first wire piece 15 and a second wire piece 16.

As shown in Figure 6, the first wire piece 15 is bent to form opposed gripping jaws 15a for fitting around the neck 12 of the jar 10 beneath the flange or bead 13 thereof, upstanding legs 15b at the ends of the jaws 15a, a bridging portion 15c extending across the space between the legs and connecting the upper ends of diagonally opposite legs 15b, inwardly converging portions 15d on the other pair of diagonally opposite legs 15b, and eye ends 15e on the converging ends of the inwardly converging portions 15d. The bridging portion 15c normally maintains the legs 15b at corresponding ends of the jaws 15a in opposed spaced parallel relation and also normally maintains the eye ends or handles 15e in aligned spaced opposed relation.

The second wire piece 16, as best shown in Figure 7, is bent to form a pair of opposed feet 16a each having eye ends 16b, together with upstanding arms 16c at the midpoints of the feet 16a, inwardly converging top portions 16d and a central loop or eye handle 16e connecting the inner ends of the converging portions 16d.

As shown in Figures 1 to 5, the feet 16a of the second wire piece 16 straddle the paired legs 15b of the first wire piece 15 and slidably receive these legs in the eye ends 16b thereof. As best shown in Figure 2, when the second piece 16 is pushed downwardly to position the feet 16a at the lower ends of the legs 15b adjacent the gripping jaws 15a, these jaws are held against spreading and encircle the jar neck 12 under the flange or bead 13. The lifter is thus in jar-gripping position and it will be noted that the handles or eye ends 15e and 16e are all in alignment. The operator's finger can be inserted through all three of the handles and the lifter and jar cannot then be separated.

As indicated in dotted lines in Figure 1, the second wire piece 16 can be raised to move the feet 16a thereof to the tops of the legs 15b, by pulling the handle 16e above the handles 15e.

As shown in Figures 4 and 5, the pulling of the wire piece 16 above the wire piece 15 causes the feet 16a to act as fulcrums for tilting of the legs 15b of the wire piece 15. This tilting is readily accomplished by pressing the handles 15e toward each other. The swinging of the legs 15b about the fulcrums provided by the feet 16a releases the jaws 15a from the jar neck 12 and moves these jaws outwardly beyond the flange or bead 13. The lifter 14 is then readily removed from the jar.

From the above descriptions it will be evident that the invention provides a simple, inexpensive easily manipulated and fool-proof lifter or tongs composed of two pieces of wire. One wire piece provides gripping jaws, lever arms, a bridge or connecting portion, and opposed handles. The other wire piece is bent to provide a bail with feet forming fulcrums for the levers of the first wire piece and also providing slide locks to hold the gripping jaws against spreading.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A lifter or tongs comprising opposed jaws, opposed legs on the ends of the jaws, a connection between one set of diagonally opposite legs holding the legs in opposed paired relation, the other set of diagonally opposite legs having free end portions that provide separate handles, slides riding on and connecting the legs of each pair, and an actuator connecting said slides to simultaneously move the slides, said slides holding the jaws against spreading when positioned at the jaw ends of the legs and when positioned in spaced relation from said jaw ends of the legs providing fulcrums for spreading said jaws whenever the handles are pressed toward each other.

2. A lifting tongs comprising a first wire piece having opposed jaw portions, an upstanding leg portion at each end of each jaw portion, a bridging portion connecting the upper end of a leg on one end of a jaw with the upper end of a leg on the other end of the other jaw, freely movable inwardly converging portions on the upper ends of the other legs, handle portions on the free inner ends of said converging portions, said bridging portion resiliently holding the legs on the same ends of the jaws in spaced opposed paired relation with the free handle portions in aligned spaced opposed relation, a second wire piece having a foot portion between each pair of legs, eye ends on the foot portions riding on the legs, an arm portion extending from each foot portion, inwardly converging portions at the upper ends of the arm portions, and a looped handle portion joining the inner ends of the converging arm portions, said second wire piece being slidable toward and away from the jaw ends of the first wire piece to lock the jaw ends against spreading and to provide fulcrums for the spreading of the jaw ends when the handles on the second wire piece are moved toward each other.

3. A jar lifter comprising a first member having opposed jar engaging jaws, upstanding legs at the ends of the jaws, and eye ended freely disposed top portions on diagonally opposite legs, and a bail member having transverse feet with end portions surrounding said legs to lock the jaws against spreading and to provide fulcrums for the spreading of the jaws when said freely disposed top portions of said legs are moved toward each other, and an eye on said bail member adapted to be aligned with the eye ends when the bail member is in jaw-locking position whereby an operator's finger can be inserted through all of the eyes to hold the lifter in locked position.

4. A lifter comprising a first member having opposed gripping jaws, upstanding legs at right angles to said gripping jaws at the ends thereof, said legs cooperating to provide opposed pairs, a bridging portion connecting a leg on one jaw end with a diagonally opposite leg on the other jaw end, and freely disposed handles above said bridging portion on the other diagonally opposite legs, and slides connecting the legs on corresponding ends of the jaws in paired relation, said slides adapted to be positioned adjacent the jaws for locking the jaws against spreading and adapted to be positioned in spaced relation from the jaws to act as fulcrums for tilting of the legs when the handles are moved towards each other to thereby spread the jaws.

5. A lifter comprising a first wire member having opposed gripping jaws, upstanding legs at the ends of the jaws, and opposed handles on the upper end of a leg of each jaw, and a second wire piece comprising a bail with transverse feet portions riding on the upstanding legs of the first wire piece forming locks resisting spreading of the gripping jaws when positioned adjacent the gripping jaws and providing fulcrums for the legs when positioned away from the gripping jaws whereby the opposed handles can be pressed toward each other to tilt the legs on the fulcrums and spread the jaws apart.

OFFICE W. PHILLIPS.